US010925033B2

(12) United States Patent
Wang et al.

(10) Patent No.: US 10,925,033 B2
(45) Date of Patent: *Feb. 16, 2021

(54) ADAPTIVE COMMUNICATION MODE SWITCHING

(71) Applicant: SZ DJI TECHNOLOGY Co., Ltd, Shenzhen (CN)

(72) Inventors: Tao Wang, Shenzhen (CN); Mingyu Wang, Shenzhen (CN); Zhongqian You, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 111 days.

This patent is subject to a terminal disclaimer.

(21) Appl. No.: 14/945,403

(22) Filed: Nov. 18, 2015

(65) Prior Publication Data

US 2016/0073378 A1    Mar. 10, 2016

Related U.S. Application Data

(63) Continuation of application No. 14/283,058, filed on May 20, 2014, now Pat. No. 9,220,086, which is a
(Continued)

(51) Int. Cl.
*H04W 72/02* (2009.01)
*H04W 76/15* (2018.01)
(Continued)

(52) U.S. Cl.
CPC ........ *H04W 72/02* (2013.01); *H04B 7/18502* (2013.01); *H04B 7/18506* (2013.01);
(Continued)

(58) Field of Classification Search
CPC ............ H04B 7/18502; H04B 7/18506; H04B 7/18508; H04L 5/0007; H04N 7/185;
(Continued)

(56) References Cited

U.S. PATENT DOCUMENTS 6,535,738 B1 *  3/2003  Bomar .................. H04W 36/18
                                                          370/331
6,754,493 B1 *  6/2004  Jetzek .................. H04W 36/18
                                                          370/329
(Continued)

FOREIGN PATENT DOCUMENTS

CN        1735241 A      2/2006
CN       101014187 A     8/2007
(Continued)

OTHER PUBLICATIONS

International search report and written opinion dated Oct. 27, 2014 for PCT/CN2014/071939.
(Continued)

*Primary Examiner* — Mohammed S Rahaman
(74) *Attorney, Agent, or Firm* — Anova Law Group, PLLC

(57) ABSTRACT

Systems, method, and devices are provided for transmitting data. In one aspect, a method includes providing a plurality of communication modules, each of the plurality of communication modules configured to transmit data using a different communication method; establishing, with the plurality of communication modules, a plurality of simultaneous respective communication links to a remote terminal; selecting, based on a switching criterion, at least one of the plurality of simultaneous respective communication links to be used to transmit data; and transmitting data via said at least one of the plurality of simultaneous respective communication links selected based on the switching criterion.

14 Claims, 10 Drawing Sheets

Related U.S. Application Data continuation of application No. PCT/CN2014/071939, filed on Feb. 10, 2014.

(51) Int. Cl.
| | |
|---|---|
| H04W 4/80 | (2018.01) |
| H04B 7/185 | (2006.01) |
| H04W 40/12 | (2009.01) |
| H04N 7/18 | (2006.01) |
| H04W 76/14 | (2018.01) |
| H04W 88/18 | (2009.01) |
| H04L 5/00 | (2006.01) |
| H04W 88/06 | (2009.01) |

(52) U.S. Cl.
CPC .............. *H04N 7/185* (2013.01); *H04W 4/80* (2018.02); *H04W 40/12* (2013.01); *H04W 76/15* (2018.02); *H04B 7/18508* (2013.01); *H04L 5/0007* (2013.01); *H04W 76/14* (2018.02); *H04W 88/06* (2013.01); *H04W 88/18* (2013.01)

(58) Field of Classification Search
CPC ....... H04W 40/12; H04W 4/80; H04W 72/02; H04W 76/14; H04W 76/15; H04W 88/06; H04W 88/18
See application file for complete search history.

(56) References Cited

U.S. PATENT DOCUMENTS

| | | | |
|---|---|---|---|
| 7,006,816 | B2 | 2/2006 | Remy |
| 7,586,514 | B1 | 9/2009 | Salazar et al. |
| 8,358,967 | B1 | 1/2013 | Rebolledo et al. |
| 8,477,190 | B2 | 7/2013 | Giuffrida et al. |
| 8,509,140 | B2 | 8/2013 | Kauffman |
| 9,220,086 | B2 | 12/2015 | Wang et al. |
| 2002/0173277 | A1 | 11/2002 | Takao et al. |
| 2004/0008253 | A1 | 1/2004 | Monroe |
| 2005/0250450 | A1 | 11/2005 | Olds |
| 2007/0032246 | A1 | 2/2007 | Feher |
| 2007/0207782 | A1* | 9/2007 | Tran .................. H04L 29/06027 455/414.1 |
| 2008/0215204 | A1* | 9/2008 | Roy ..................... G05D 1/0044 701/28 |
| 2009/0111456 | A1* | 4/2009 | Shaffer ................. H04W 36/30 455/422.1 |
| 2010/0087980 | A1 | 4/2010 | Spura |
| 2010/0153985 | A1* | 6/2010 | Dey ................ H04N 21/41407 725/25 |
| 2010/0224732 | A1 | 9/2010 | Olson et al. |
| 2011/0021231 | A1* | 1/2011 | Burns .................... H04W 76/14 455/509 |
| 2011/0130092 | A1 | 6/2011 | Yun et al. |
| 2012/0007982 | A1 | 1/2012 | Giuffrida et al. |
| 2012/0021694 | A1 | 1/2012 | Prince et al. |
| 2012/0122461 | A1 | 5/2012 | Hossain et al. |
| 2012/0295537 | A1 | 11/2012 | Zaruba et al. |
| 2012/0323603 | A1* | 12/2012 | Muradia ............. G06F 19/3418 705/3 |
| 2013/0113831 | A1 | 5/2013 | Giuffrida et al. |
| 2013/0130739 | A1 | 5/2013 | Kawakita et al. |
| 2014/0013002 | A1 | 1/2014 | Holstein et al. |
| 2014/0036702 | A1 | 2/2014 | Van Wyk et al. |
| 2014/0295766 | A1* | 10/2014 | Matsumoto ........ H04N 1/00106 455/41.3 |
| 2015/0230150 | A1 | 8/2015 | Wang et al. |
| 2015/0230207 | A1 | 8/2015 | Wang et al. |

FOREIGN PATENT DOCUMENTS

| | | |
|---|---|---|
| CN | 101467374 A | 6/2009 |
| CN | 102201865 A | 9/2011 |
| CN | 102494658 A | 6/2012 |
| CN | 102497658 A | 6/2012 |
| CN | 102572990 A | 7/2012 |
| CN | 102628963 A | 8/2012 |
| CN | 103490842 A | 1/2014 |
| CN | 103595457 A | 2/2014 |
| CN | 103684571 A | 3/2014 |
| CN | 204068025 U | 12/2014 |
| CN | 204168292 U | 2/2015 |
| EP | 1798872 A2 | 6/2007 |
| EP | 2023685 A1 | 2/2009 |
| EP | 2378676 A1 | 10/2011 |
| KR | 20130088597 A | 8/2013 |
| WO | WO-2005015838 A1 | 2/2005 |

OTHER PUBLICATIONS

Notice of allowance dated Aug. 21, 2015 for U.S. Appl. No. 14/283,058.
Office action dated Jan. 9, 2015 for U.S. Appl. No. 14/283,058.
Office action dated Jan. 13, 2015 for U.S. Appl. No. 14/186,819.
Office action dated Aug. 14, 2014 for U.S. Appl. No. 14/283,058.
European search report and opinion dated Apr. 25, 2016 for EP Application No. 14881702.

\* cited by examiner

ADAPTIVE COMMUNICATION MODE SWITCHING

CROSS REFERENCE

This application is a continuation application of U.S. patent application Ser. No. 14/283,058, filed on May 20, 2014, which is a continuation application of International Application No. PCT/CN2014/071939, filed on Feb. 10, 2014, the content of which is hereby incorporated by reference in their entirety.

BACKGROUND

Unmanned vehicles, such as ground vehicles, air vehicles, surface vehicles, underwater vehicles, and spacecraft, have been developed for a wide range of applications including surveillance, search and rescue operations, exploration, and other fields. In some instances, unmanned vehicles may be equipped with sensors for collecting data from the surrounding environment. For example, unmanned aerial vehicles are commonly provided with cameras for aerial photography.

The sensing data collected by the unmanned vehicle can be transmitted to a remote user in real time. However, existing approaches for data transmission from unmanned vehicles can be less than ideal. In some instances, the range of data transmission and other communication with an unmanned vehicle may be limited by line of sight.

SUMMARY

A need exists for improved communication with movable objects such as unmanned vehicles. The present invention provides systems, methods, and devices for communicating with movable objects. In some embodiments, the systems, methods, and devices described herein provide adaptive switching between a plurality of communication modes based on a predetermined switching criterion. Advantageously, the adaptive communication mode switching disclosed herein can be used to extend the range and robustness of data transmission from movable objects.

In one aspect of the present disclosure, a method for transmitting data is provided. The method comprises: providing a plurality of communication modules, each of the plurality of communication modules configured to transmit data using a different communication method; establishing, with the plurality of communication modules, a plurality of simultaneous respective communication links to a remote terminal; calculating whether one or more characteristics of each of the plurality of simultaneous respective communication links meets a switching criterion; selecting, based on the switching criterion, at least one of the plurality of simultaneous respective communication links to be used to transmit data; and transmitting data via said at least one of the plurality of simultaneous respective communication links selected based on the switching criterion.

In some embodiments, the plurality of communication modules are carried by a movable object. The movable object can be an unmanned aerial vehicle.

In some embodiments, each of the simultaneous respective communication links is established between one of the plurality of communication modules and one of a plurality of corresponding communication modules of the remote terminal.

In some embodiments, a maximum communication distance of at least one of the different communication methods is within the range of 0.5 km to 20 km.

In some embodiments, at least one of the different communication methods does not require line of sight to operate.

In some embodiments, at least one of the different communication methods comprises a direct communication method. The direct communication method can comprise one of the following: WiFi, WiMAX, or coded orthogonal frequency-division multiplexing (COFDM). At least one of the different communication methods can comprise an indirect communication method. The indirect communication method can comprise communication via a mobile phone network. The mobile phone network can be a 3G or 4G network. The indirect communication method can utilize forward error correction.

In some embodiments, the switching criterion is based on signal strength of signals received by at least one of the plurality of communication modules.

In some embodiments, the switching criterion is based on signal quality of signals received by at least one of the plurality of communication modules.

In another aspect of the present disclosure, a data-transmitting apparatus is provided. The apparatus comprises: a plurality of communication modules each configured to transmit data to a remote terminal using a different communication method, wherein a plurality of simultaneous respective communication links are established between the plurality of communication modules and the remote terminal; one or more processors configured to: (i) calculate whether one or more characteristics of each of the simultaneous respective communication links meets a switching criterion; and (ii) select, based on the switching criterion, at least one of the plurality of simultaneous respective communication links to be used to transmit data; and a controller configured to output control signals causing data transmission to occur via said at least one of the plurality of simultaneous respective communication links selected based on the switching criterion.

In another aspect of the present disclosure, a method for transmitting images from a movable object is provided. The method comprises: providing the movable object comprising a first communication module configured to transmit image data using a first communication method and a second communication module configured to transmit image data using a second communication method different from the first communication method; obtaining image data with the movable object; performing calculations, based on a switching criterion, in order to select at least one of the first communication module or the second communication module to be used to transmit the image data; and transmitting the image data using said at least one of the first communication module or the second communication module selected based on the switching criterion.

In another aspect of the present disclosure, a method for controlling a movable object with a terminal is provided. The method comprises: providing the terminal comprising a first communication module configured to transmit control data to the movable object using a first communication method and a second communication module configured to transmit control data to the movable object using a second communication method different from the first communication method; generating control data configured to control a state of the movable object; performing calculations, based on a switching criterion, in order to select at least one of the first communication module or the second communication module to be used to transmit the control data; and transmitting the control data to the movable object using said at least one of the first communication module or the second communication module selected based on the switching criterion.

In some embodiments, the movable object is an unmanned aerial vehicle.

In some embodiments, at least one of the first communication method or the second communication method does not require line of sight to operate.

In some embodiments, a maximum communication distance of the first communication method is smaller than a maximum communication distance of the second communication method.

In some embodiments, the first communication method comprises a direct communication method. The direct communication method can comprise one of the following: WiFi, WiMAX, or coded orthogonal frequency-division multiplexing (COFDM). The second communication method can comprise an indirect communication method. The indirect communication method can comprise communication via a mobile phone network. The mobile phone network can be a 3G or 4G network. The indirect communication method can utilize forward error correction.

In some embodiments, the switching criterion is based on signal strength of signals received by at least one of the first communication module or the second communication module.

In some embodiments, the switching criterion is based on signal quality of signals received by at least one of the first communication module or the second communication module.

In some embodiments, the image data is transmitted to a terminal remote from the movable object.

In some embodiments, the movable object comprises one or more image sensors and the image data is generated by the one or more image sensors.

In some embodiments, the image data is generated by one or more image sensors provided separately from the movable object.

In some embodiments, the control data comprises instructions for controlling one or more of altitude, latitude, or longitude of the movable object.

In some embodiments, the control data comprises instructions for controlling one or more of roll angle, pitch angle, or yaw angle of the movable object.

In some embodiments, the control data is generated based on user input.

In another aspect of the present disclosure, a data-transmitting movable object is provided. The movable object comprises: a first communication module configured to transmit image data using a first communication method; and a second communication module configured to transmit image data using a second communication method different from the first communication method; one or more processors configured to perform calculations, based on a switching criterion, in order to select at least one of the first communication module or the second communication module to be used to transmit the image data; and a controller configured to output control signals causing the image data to be transmitted via said at least one of the first communication module or the second communication module selected based on the switching criterion.

In another aspect of the present disclosure, a non-transitory computer readable medium containing program instructions for transmitting data to a movable object is provided. The computer readable medium comprises: program instructions for a terminal comprising a first communication module configured to transmit control data to the movable object using a first communication method and a second communication module configured to transmit control data to the movable object using a second communication method different from the first communication method, wherein the program instructions cause the terminal to: generate control data configured to control a state of the movable object; perform calculations, based on a switching criterion, in order to select at least one of the first communication module or the second communication module to be used to transmit the control data; and transmit the control data to the movable object using said at least one of the first communication module or the second communication module selected based on the switching criterion.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
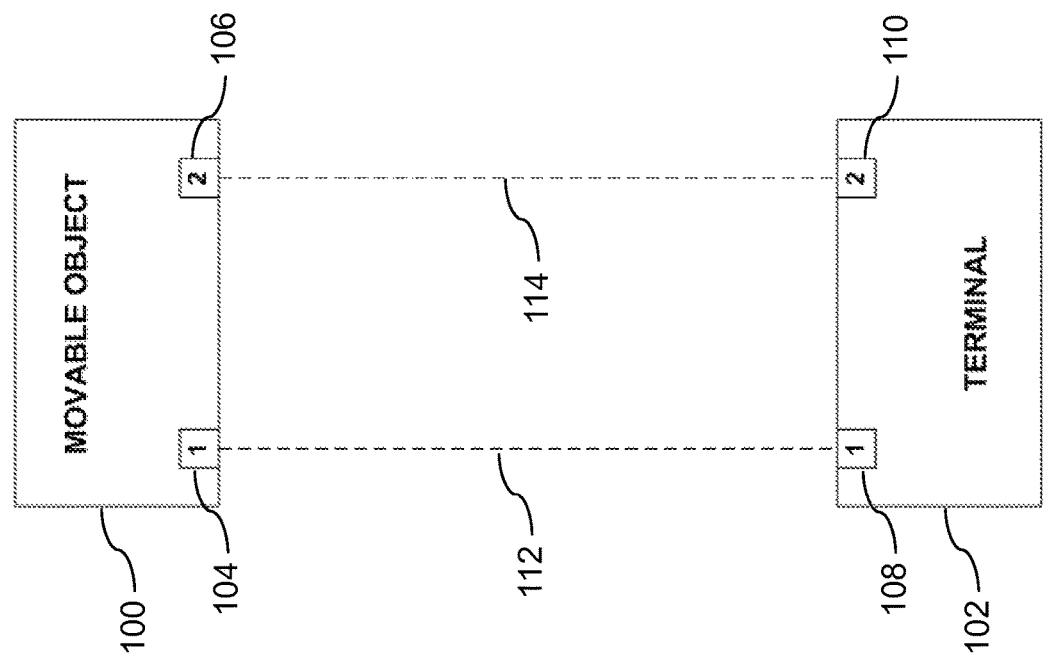
FIG. 1 illustrates a movable object communicating with a remote terminal, in accordance with embodiments.

The systems, methods, and devices of the present invention provide improved communication with movable objects, such as a self-propelled movable object (e.g., an unmanned aerial vehicle (UAV)). In some embodiments, the movable objects described herein are configured to communicate data to a remote terminal using a plurality of different communication methods. The disclosed systems, methods, and devices enable adaptive switching between the different communication methods based on a predetermined switching criterion in order to optimize the speed, latency, bandwidth, quality, and/or range of communication. It shall be understood that different aspects of the invention can be appreciated individually, collectively, or in combination with each other. Various aspects of the invention described herein may be applied to any of the particular applications set forth below or for any other types of movable objects.

For example, the present invention can be applied to a UAV configured for aerial photography. The UAV can be equipped with an image sensor (e.g., a camera) for generating image data. When desired, the image data can be transmitted from the UAV to a remote terminal in order to provide real-time aerial surveillance, first-person view piloting, or other suitable applications. Existing approaches for image data transmission from UAVs typically utilize direct or point-to-point communication links, which may be limited by having relatively short communication ranges and a requirement for line of sight. The systems, methods, and devices disclosed herein enable switching of image data transmission between a plurality of communication links, which can include direct communication links as well as indirect communication links. Indirect communication links may have longer communication ranges than direct communication links and may not require line of sight. Accordingly, by adaptively switching between the plurality of communication links, continuous image data transmission can be maintained even over long distances or when line of sight is obstructed.

In one aspect, the present invention provides a method for transmitting data having one or more of the following steps. In one embodiment, a method comprises: providing a plurality of communication modules, each of the plurality of communication modules configured to transmit data using a different communication method; establishing, with the plurality of communication modules, a plurality of simultaneous respective communication links to a remote terminal; calculating whether one or more characteristics of each of the plurality of simultaneous respective communication links meets a switching criterion; selecting, based on the switching criterion, at least one of the plurality of simultaneous respective communication links to be used to transmit data; and transmitting data via said at least one of the plurality of simultaneous respective communication links selected based on the switching criterion.

The communication modules of the present invention can be carried by a movable object configured to communicate with a remote terminal. For example, control data can be transmitted from the terminal to the movable object, and data collected by the movable object (e.g., surveillance data) can be transmitted back to the terminal. Each of plurality of communication modules can be configured to communicate with a corresponding communication module of the remote terminal by a respective communication link. Each of the communication modules can be configured to communicate using a different communication method. In some instances, certain communication methods may be more optimal than others for data transmission (e.g., with respect to superior speed, bandwidth, latency, range, quality, cost, and other characteristics). Accordingly, when several communication links are simultaneously available, a suitable switching criterion can be implemented to actively select one or more communication links that provide optimized data transmission. For example, a calculation can be performed to determine whether the characteristics of each of the communication links meet the standards for data transmission set by the switching criterion. In some cases, certain communication methods may be on the verge of no longer being available or operable, a suitable switching criterion can be used to detect this condition so that another communication link can be selected. By adaptively switching between the communication links, this approach can provide seamless data transmission with improved robustness and stability.

In another embodiment, the present invention provides a method for transmitting images from a movable object. The method comprises: providing the movable object comprising a first communication module configured to transmit image data using a first communication method and a second communication module configured to transmit image data using a second communication method different from the first communication method; obtaining image data with the movable object; performing calculations, based on a switching criterion, to select at least one of the first communication module or the second communication module to be used to transmit the image data; and transmitting the image data using said at least one of the first communication module or the second communication module selected based on the switching criterion.

The movable object having a plurality of communication modules disclosed above is equally applicable to this embodiment. Where desired, such movable objects can be modified to include one or more image sensors (e.g., a camera). The image sensors can be adapted to generate image data, which can include photographs or videos of the environment surrounding the movable object. Alternatively, the image data can be generated by image sensors provided separately from the movable object, such as image sensors of an imaging device in communication with the movable object. The image data can be transmitted from the movable object via a communication module selected based on calculations using a switching criterion, as described above. Advantageously, this approach can be used to provide robust and seamless transmission of image data collected by a movable object.

In another embodiment, the present invention provides a method for controlling a movable object with a terminal. The method comprises: providing a terminal comprising a first communication module configured to transmit control data to a movable object using a first communication method and a second communication module configured to transmit control data to the movable object using a second communication method different from the first communication method; generating control data configured to control a state of the movable object; performing calculations, based on a switching criterion, in order to select at least one of the first communication module or the second communication module to be used to transmit the control data; and transmitting the control data to the movable object using said at least one of the first communication module or the second communication module selected based on the switching criterion.

The terminal and movable object disclosed above are equally applicable to this embodiment. Where desired, the terminal can be modified to include communication modules suitable for transmitting control data to the movable object. The control data can be used to control a state of the movable object, such as a position of the movable object with respect to up to three degrees of freedom, or an orientation of the movable object with respect to up to three degrees of freedom. Similar to the embodiments previously described herein, a calculation can be performed, based on a switching criterion, to determine which of the communication modules is optimal for transmitting the control data to the movable object. This approach enables greater flexibility and range in controlling movable objects using a remote control device such as a terminal.

In a separate aspect, the present invention provides a data-transmitting apparatus having one or more of the unique features disclosed below. In one embodiment, the apparatus comprises: a plurality of communication modules each configured to transmit data to a remote terminal using a different communication method, wherein a plurality of simultaneous respective communication links are established between the plurality of the communication modules and the remote terminal. The apparatus also comprises one or more processors configured to: (i) calculate whether one or more characteristics of each of the plurality of simultaneous respective communication links meets a switching criterion; and (ii) select, based on a switching criterion, at least one of the plurality of simultaneous respective communication links to be used to transmit data. The apparatus also comprises a controller configured to output control signals causing data transmission to occur via said at least one of the plurality of simultaneous respective communication links selected based on the switching criterion.

The movable object, remote terminal, and communication modules disclosed above are equally applicable to this embodiment. In some instances, a suitable controller can be used to provide control signals causing the communication modules to establish communication links and transmit data. One or more processors can be used to perform calculations based on a switching criterion to actively select optimal communication links for data transmission. The apparatus described herein can be used to enhance the robustness and stability of communication with a movable object.

In a separate aspect, the present invention provides a data-transmitting movable object. In one embodiment, the movable object comprises a first communication module configured to transmit image data using a first communication method; and a second communication module configured to transmit image data using a second communication method different from the first communication method; one or more processors configured to perform calculations, based on a switching criterion, in order to select at least one of the first communication module or the second communication module to be used to transmit the image data; and a controller configured to output control signals causing the image data to be transmitted via said at least one of the first communication module or the second communication module selected based on the switching criterion.

The movable object having a plurality of communication modules and image sensors disclosed above are equally applicable to this embodiment. Where desired, a the movable object can include one or more processors used to perform calculations based on the switching criterion in order to actively select the optimal communication modules for image data transmission. The movable object can also include a controller causing the selected communication modules to transmit the image data. As previously described, this system can provide robust and seamless image data transmission from the movable object.

In a separate aspect, the present invention provides a non-transitory computer readable medium containing program instructions for transmitting data to a movable object having one or more of the unique features disclosed below. In one embodiment, the computer readable medium comprises program instructions for a terminal comprising a first communication module configured to transmit control data to a movable object using a first communication method and a second communication module configured to transmit control data to the movable object using a second communication method different from the first communication method. The program instructions can cause the terminal to: generate control data configured to control a state of the movable object; perform calculations, based on a switching criterion, in order to select at least one of the first communication module or the second communication module to be used to transmit the control data; and transmit the control data to the movable object using said at least one of the first communication module or the second communication module selected based on the switching criterion.

The terminal having communication modules for transmitting control data as disclosed above is equally applicable to this embodiment. The computer readable medium can include program instructions, code, or logic suitable for causing the terminal to generate control data for controlling a state of the movable object as described herein. The computer readable medium can also include program instructions for performing calculations, based on a switching criterion, to select a communication module for transmitting the control data. Advantageously, the computer readable medium of this embodiment can be used to enable robust and continuous transmission of control data from the terminal to the movable object.

Referring now to the drawings, FIG. 1 illustrates a movable object 100 communicating with a remote terminal 102, in accordance with embodiments. Any descriptions herein of the movable object 100 communicating with the terminal 102 can also be applied to communication with any number of terminals or other suitable remote devices. Furthermore, communication of the terminal 102 with the movable object 100 as disclosed herein can be applied to communication with any suitable number of movable objects.

The movable object 100 can be configured to move within various environments (e.g., air, water, ground, space, or combinations thereof). In some embodiments, the movable object 100 can be a vehicle (e.g., an aerial vehicle, water vehicle, ground vehicle, or space vehicle). Optionally, the movable object 100 can perform one or more functions. For example, the movable object 100 can be a UAV provided with a camera for aerial photography operations. However, as previously mentioned, any description pertaining to an aerial vehicle such as a UAV may apply to any other type of movable object, and vice-versa. Further details on exemplary movable objects of the present invention are provided elsewhere herein.

The terminal 102 can be a remote control device at a location distant from the movable object 100. The terminal 102 can be used to control any suitable state of the movable object 100. For example, the terminal 102 can be used to control the position (e.g., location and/or orientation) of the movable object using commands or control data transmitted to the movable object 100. The terminal 102 can include a suitable display unit for viewing information of the movable object 100. For example, the terminal 102 can be configured to display information of the movable object 100 with respect to position, translational velocity, translational acceleration, orientation, angular velocity, angular acceleration, or any suitable combinations thereof. In some embodiments, the terminal 102 can display information collected by the movable object 100, such as image data recorded by a camera coupled to the movable object 100. Additional descriptions of exemplary terminals of the present invention are provided elsewhere herein.

The movable object 100 can include a first communication module 104 and a second communication module 106, and the terminal 102 can include a corresponding first communication module 108 and a corresponding second communication module 110. Any description herein of communication modules of a movable object can also be applied to communication modules of a terminal, and vice-versa. For example, the communication modules disclosed herein can be incorporated in a movable object, a terminal, or any other entity in communication with a movable object and/or terminal. The communication modules can include transmitters and/or receivers configured to transmit and/or receive data. For example, the communication modules can include transceivers incorporating one or more transmitters and one or more receivers. The transceiver may have one or more transmitters and one or more receivers integrated into a single component, or distributed over multiple components of the transceiver. Any description herein referring to a transmitter or receiver may also refer to a transmitter or receiver of a transceiver, respectively. In some instances, a transmitter can be configured to transmit data at a specified signal strength. A receiver can be associated with a receiver sensitivity, and the receiver sensitivity can be characterized by a minimum signal strength of a data transmission for which the receiver can receive the data.

The first communication modules of the movable object and terminal 104, 108 and the second communication modules of the movable object and terminal 106, 110 can be in communication with each other via respective communication links 112, 114. Any suitable number of communication modules (e.g., two, three, four, five, six, or more) can be used to establish a corresponding number of distinct communication links. In some instances, one or more of the plurality of communication links may simultaneously be available. Optionally, all of the communication links may simultaneously be available. An available communication link may refer to a communication link that is not disconnected, dropped, or otherwise currently unable of communicating data). Dual-mode communication may be provided between the movable object and terminal, which may result in providing two simultaneous communication links. In some instances, multi-mode communication may be provided between the movable object and terminal, which may include providing a plurality of simultaneous communication links (e.g., two or more, three or more, four or more, five or more, or six or more simultaneous communication links).

In some embodiments, the communication links can be two-way communication links, such that both the movable object 100 and the terminal 102 can receive and transmit data via the communication links. Alternatively, one or more of the communication links can be a one-way communication link suitable for transmitting data in a single direction (e.g., from the movable object 100 to the terminal 102, or vice-versa). For example, a data transmission link may be used to transmit sensing data collected by the movable object 100 (e.g., position and/or orientation data collected by GPS sensors or inertial sensors, image data collected by a camera) to the terminal 102 only, while a control data transmission link may be used to transmit control data (e.g., based on user input) from the terminal 102 to the movable object 100 only.

In some embodiments, each of the communication modules may communicate using a different communication method. Optionally, one or more communication modules may use the same communication method. In some instances, a communication method may require line of sight to operate. Alternatively, a different communication method may not require line of sight to operate. Some communication methods can be proximity dependent while other communication methods can be proximity independent. The communication methods can involve wired communication methods, wireless communication methods, or suitable combinations thereof. Wired communication may utilize wires, cables, fiber optics, waveguides, and other suitable physical connections to transmit data. Wireless communication methods may utilize radio waves, infrared waves, sound waves, or light waves to transmit data. In some instances, wired and/or wireless communication methods can involve transmitting data over telecommunication networks, cellular networks, or data networks, which may be local area networks (LANs) or wide area networks (WANs). The networks may include the Internet or Internet-based networks, such as cloud communication networks. Some networks may be public networks, while other networks may be private networks. The data can be transmitted directly between the movable object 100 and the terminal 102 (e.g., direct communication, also known as point-to-point communication). Alternatively, the data can be transmitted between the movable object 100 and the terminal 102 via one or more intermediate network nodes (e.g., indirect communication). The network nodes may be relay stations, towers, satellites, mobile stations, computers, servers, and the like. The network nodes may be stationary nodes. Conversely, the network nodes may be movable nodes, such as nodes situated on a movable object (e.g., a satellite). Some example of suitable communication methods include: WiFi, WiMAX, coded orthogonal frequency-division multiplexing (COFDM), and mobile or cellular phone networks (e.g., 3G or 4G networks).

For example, the first communication modules 104, 108 can utilize a direct communication method and the second communication modules 106, 110 can utilize an indirect communication method. Accordingly, the first communication link 112 can be a direct communication link and the second communication link 114 can be an indirect communication link. The direct communication link 112 may require line of sight, while the indirect communication link 114 may not require line of sight. In some instances, the direct communication method can use WiFi, WiMAX, or COFDM, while the indirect communication method can use mobile phone networks. The direct and indirect communication links 112, 114 may be operated simultaneously, such that data is transmitted along one or both of the communication links 112, 114. The data transmission may switch between utilizing the direct and indirect communication links 112, 114 (e.g., when one of the links is disconnected), as described in further detail below.

Figure 2:
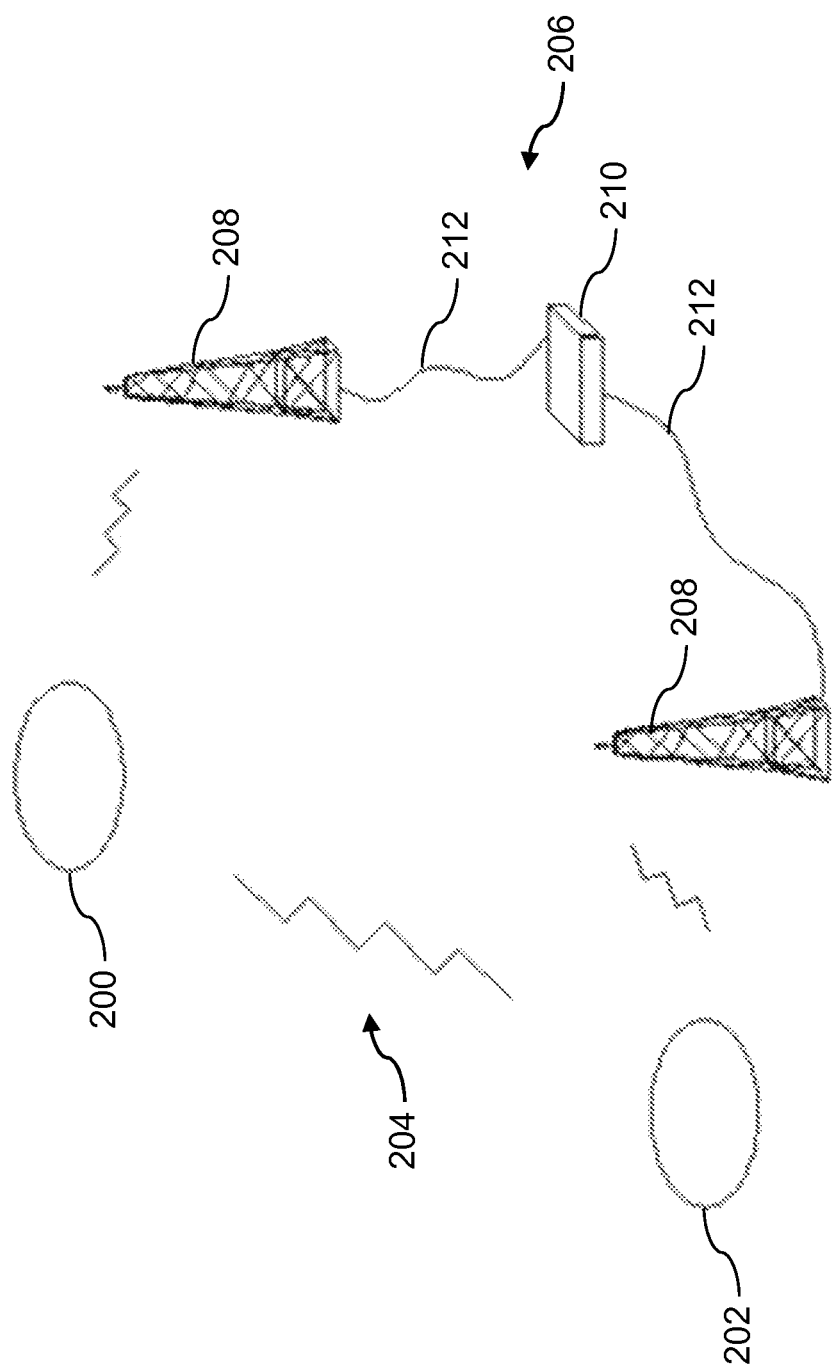
FIG. 2 illustrates another example of a movable object communicating with a remote terminal, in accordance with embodiments.

FIG. 2 illustrates a movable object 200 communicating with a terminal 202 via first and second communication links 204, 206, in accordance with embodiments. Similar to embodiments of FIG. 1 described herein, the first communication link 204 can be a point-to-point or direct communication link, such that data is directly transmitted between the movable object 200 and terminal 202 without any intervening network nodes, and the second communication link 206 can be an indirect communication link, such that data is transmitted between the movable object 200 and the terminal 202 via a series of intermediate network nodes. In some embodiments, the direct communication link 204 can be a WiFi, WiMAX, or COFDM link. The indirect communication link 206 can be a mobile phone network link, such as a 3G or 4G network link. For example, the network nodes of the indirect communication link 206 are depicted in FIG. 2 as mobile stations 208 and network switch 210, with the mobile stations 208 communicating with the network switch 210 via cables 212 and communicating with the movable object 200 and terminal 202 via wireless communication. However, it shall be understood that the indirect communication link 206 can include any suitable number and type of network nodes, and the network nodes can be respectively interlinked using any suitable type of communication method, as previously described herein.

In some embodiments, a direct communication link 204 may require line of sight between the movable object 200 and the terminal 202, while the indirect communication link 206 does not require a line of sight between the movable object and the terminal. Obstructions, such as physical structures may hamper a direct communication link, while obstructions need not hamper the indirect communication link. In some instances, an indirect communication link may have a larger geographic range than a direct communication clink. Optionally, an indirect communication link may be more reliable (i.e., less likely to drop out) than a direct communication link. In some instances, a direct communication link may be capable of transmitting data at higher speeds than an indirect communication link.

In some embodiments, a communication mode may use a communication link for transmitting data, the corresponding communication modules, and/or the corresponding communication method. A communication mode can be associated with one or more characteristics, such as data transmission signal strength, speed, latency, bandwidth, quality, range, or cost. The characteristics may depend on the properties of the communication module, communication link, and/or communication method of the communication mode. Any description herein referring to a communication mode may be applied to any communication links, communication modules, and/or communication methods used by the communication mode, and vice-versa. For example, a communication mode can use a high speed communication method or a low speed communication method. High speed and low speed can be defined based on a maximum data transmission speed, maximum data throughput, average data transmission speed, or average data throughput. The maximum data transmission speed, maximum data throughput, average data transmission speed, or average data throughput of a low speed communication method can be less than or equal to approximately: 10 Kbps, 50 Kbps, 100 Kbps, 500 Kbps, 1 Mbps, 5 Mbps, 10 Mbps, 50 Mbps, 100 Mbps, 500 Mbps, 1 Gbps, 5 Gbps, or 10 Gbps. Conversely, the maximum data transmission speed, maximum data throughput, average data transmission speed, or average data throughput of a high speed communication method can be greater than or equal to approximately: 10 Kbps, 50 Kbps, 100 Kbps, 500 Kbps, 1 Mbps, 5 Mbps, 10 Mbps, 50 Mbps, 100 Mbps, 500 Mbps, 1 Gbps, 5 Gbps, or 10 Gbps. Alternatively, high speed and low speed communication methods may be defined relative to each other and not based on an absolute numerical value. For example, a maximum data transmission speed, maximum data throughput, average data transmission speed, or average data throughput of a low speed communication method may be lower than a maximum data transmission speed, maximum data throughput, average data transmission speed, or average data throughput of a high speed communication method. In some embodiments, some of the communication modes can utilize low speed communication methods and some of the communication modes can utilize high speed communication methods. Alternatively, all of the communication modes can use low speed communication methods or high speed communication methods.

Similarly, a communication mode can utilize a long range communication method or a short range communication method. Long range and short range can be defined based on a maximum communication distance over which the communication modules are still able communicate with each other (e.g., with sufficient signal strength for data transmission). The maximum communication distance of a short range communication method can be less than or equal to approximately: 10 m, 50 m, 100 m, 500 m, 1 km, 10 km, 50 km, 100 km, 500 km, 1000 km, or 5000 km. Conversely, the maximum communication distance of a long range communication method can be greater than or equal to approximately: 10 m, 50 m, 100 m, 500 m, 1 km, 10 km, 50 km, 100 km, 500 km, 1000 km, or 5000 km. Optionally, the maximum communication distance of a short range or long range communication method can be within the range of approximately: 10 m to 50 m, 10 m to 100 m, 50 m to 500 m, 100 m to 1 km, 100 m to 10 km, 1 km to 10 km, 1 km to 100 km, 1 km to 1000 km, 100 km to 1000 km, 500 km to 5000 km, or 1000 km to 5000 km. Alternatively, long range and short range communication methods may be defined relative to each other and not based on an absolute numerical value. For example, a maximum communication distance of a short range communication method may be smaller than a maximum communication distance of a long range communication method. In some embodiments, some of the communication modes can utilize short range communication methods and some of the communication modes can utilize long range communication methods. Alternatively, all of the communication modules can use short range communication methods or long range communication methods.

The characteristics of a communication mode may change based on a state of the movable object and/or the terminal (e.g., position, orientation, whether data is currently being transmitted, or the type of data to be transmitted). Alternatively or in combination, the characteristics can depend on a state of the movable object and the terminal relative to each other, such as the distance between the movable object and the terminal, whether there is line of sight between the movable object and the terminal, or the direction of data transmission between the movable object and the terminal. Additional factors such as weather, type of data being transmitted, obstructions that may come between the movable object and terminal, may also affect the communication mode. For example, the signal strength of signals received by a communication module may increase as the movable object and terminal move closer to each other and decrease as the movable object and the terminal move away from each other, or vice-versa. Similarly, the signal quality of signals received by a communication module may increase as the movable object and terminal move closer to each other and decrease as the movable object and the terminal move away from each other, or vice-versa.

In some instances, certain communication modes may be more optimal for data transmission than other communication modes, based on one or more characteristics of the communication modes as described herein. Optimal may refer to a communication mode that is better relative to another communication mode, a communication mode that is better relative to all other communication modes, or a communication mode that meets or exceeds a specified absolute standard. An optimal communication mode may refer to a communication mode having the ability to transmit data at the strength, speed, latency, bandwidth, quality, range, cost, and/or other characteristic specified by the user. The characteristics used to determine an optimal communication mode may vary based on a state of the movable object, terminal, and/or the movable object and terminal relative to each other. For example, when the movable object and the terminal are relatively close to one another, or within line of sight of each other, a point-to-point communication mode (e.g., utilizing WiFi, WiMAX, COFDM) may be more optimal due to its relatively high data transmission speed and bandwidth and relatively low latency and cost. Conversely, when the movable object and the terminal are relative far from each other, or out of line of sight of each other, an indirect communication mode (e.g., utilizing mobile phone networks) may be more optimal due to its relatively long data transmission range.

Thus, in some embodiments, it may be desirable to provide adaptive switching between the plurality of communication modes in order to continuously optimize data transmission between the movable object and the terminal. Adaptive communication mode switching as described herein can be used to enhance the robustness and stability of data transmission even as changes occur in the characteristics of the communication modes, the state of the movable object, the state of the terminal, and/or a state of the movable object and the terminal relative to each other. Furthermore, such adaptive communication mode switching can be used to combine the advantages of individual communication methods while minimizing the impact of any communication method-specific disadvantages. For example, adaptive switching between a high speed, short range communication mode and a low speed, long range communication mode can provide high data transmission speeds over short distances while maintaining seamless communication over long distances.

Figure 3:
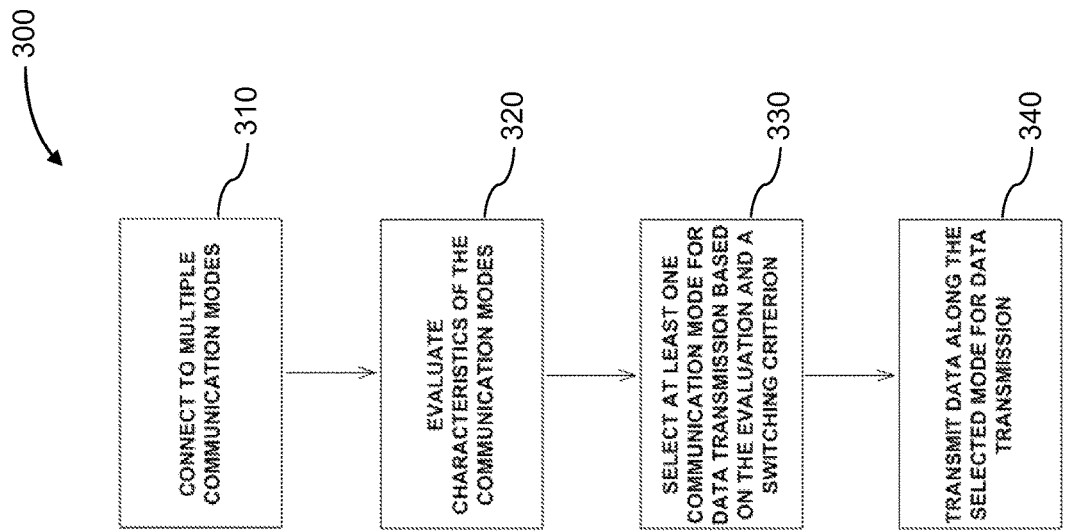
FIG. 3 is a schematic illustration by way of block diagram of a method for implementing adaptive communication mode switching, in accordance with embodiments.

FIG. 3 is a schematic illustration by way of block diagram of a method 300 for implementing adaptive communication mode switching, in accordance with embodiments. Any suitable device or system can be used to practice the method 300, such as the embodiments described herein. The steps of the method 300 can be practiced by a device or system situated on a movable object and/or a terminal.

In step 310, the movable object and/or the terminal connects to multiple communication modes. In some embodiments, a plurality of communication modules of the movable object can be used to establish a plurality of simultaneous respective communication links to a remote terminal, or vice-versa. A suitable controller or control system may cause the communication modules to establish the communication links via control signals, as described in further detail below. Establishing a communication link may involve each of a pair of communication modules receiving a signal from the other communication module, for example, at a specified signal strength and/or specified signal quality. The specified signal strength can be a signal strength greater than or equal to a threshold strength value for data transmission. In some embodiments, the threshold strength value can be determined based on the receiver sensitivity of the receivers of the communication modules. The threshold strength value can be less than or equal to approximately: $-150$ dBm, $-100$ dBm, $-90$ dBm, $-80$ d dBm, $-70$ dBm, $-60$ dBm, $-50$ dBm, $-40$ dBm, $-30$ dBm, $-20$ dBm, $-10$ dBm, or 0 dBm. Conversely, the threshold strength value can be greater than or equal to approximately: $-150$ dBm, $-100$ dBm, $-90$ dBm, $-80$ d dBm, $-70$ dBm, $-60$ dBm, $-50$ dBm, $-40$ dBm, $-30$ dBm, $-20$ dBm, $-10$ dBm, or 0 dBm. The specified signal quality can be based on a bit error rate (BER) of data transmission. For example, a communication link can be considered to be of sufficient quality for data transmission if the BER is less than a specified threshold BER value for a certain time interval. The threshold BER value can be less than or equal to approximately: $10^0$, $10^{-1}$, $10^{-2}$, $10^{-3}$, $10^{-4}$, $10^{-5}$, $10^{-6}$, $10^{-7}$, $10^{-8}$, $10^{-9}$, or $10^{-10}$. Conversely, the threshold BER value can be greater than or equal to approximately: $10^0$, $10^{-1}$, $10^{-2}$, $10^{-3}$, $10^{-4}$, $10^{-5}$, $10^{-6}$, $10^{-7}$, $10^{-8}$, $10^{-9}$, or $10^{-10}$.

In some embodiments, in order to establish a communication link for a network-based communication mode, it may be necessary for a pair of communication modules to exchange network identification data with each other. For example, a communication module utilizing an Internet Protocol (IP) network (e.g., mobile phone networks, the Internet, or Internet-based networks) to communicate may be associated with a unique IP address. The IP address can be a static IP address or a dynamic IP address. In order to transmit data to the corresponding recipient communication module, it may be necessary to know the recipient module's IP address.

Any suitable method can be used to obtain the network identification data of the recipient communication module. In some instances, if the identification data is fixed (e.g., a static IP address) or otherwise known prior to operation, then the identification data of each of a pair of communication modules can be directly provided to the other (e.g., via user input or hard-coded into memory). Alternatively, if the identification data is dynamically determined (e.g., a dynamic IP address) or otherwise unknown prior to operation, the identification data can be mutually exchanged in step 310. In some embodiments, the identification data can be exchanged using another communication link that has already been established. For example, if a direct communication link is already available, the identification data for a network-based communication link (e.g., an IP address for a mobile phone network, the Internet, or Internet-based networks) can be mutually exchanged via the direct communication link. Alternatively or in combination, the identification data of a communication module can be transmitted to an intermediary configured to route the identification data to the corresponding recipient communication module. For example, each of a pair of communication modules can transmit its IP address to a public server having a known IP address. The public server can be configured to recognize that the communication modules are paired (e.g., by user input or hard-coding). Accordingly, the public server can transmit the IP address of each communication module to its partner communication module, thereby facilitating the IP address exchange.

In some embodiments, establishing a communication link for a network-based communication mode may not require the mutual exchange of network identification data between communication modules. For example, a network-based communication mode can involve sending all data to an intermediary (e.g., a public server) responsible for routing the data to the correct recipient communication module. Accordingly, each communication module may only need to know the network identification data (e.g., IP address) of the intermediary in order to transmit data to the recipient communication module.

In step 320, the characteristics of each of the plurality of established communication modes are evaluated. Suitable characteristics for evaluation may include one or more of signal strength, speed, latency, bandwidth, quality, range, or cost, as previously described herein. In some instances, the characteristics may be quantifiable characteristics, such that evaluating the characteristics involves calculating one or more numerical values representative of the characteristics. The numerical values may include a mean value (e.g., a mean value over time), a median value, a mode value, a maximum value, a minimum value, or a range of values.

In step 330, at least one communication mode is selected for data transmission (e.g., by a suitable controller or processor as described elsewhere herein) based on the evaluation of step 320 and a switching criterion. In some embodiments, the switching criterion can be implemented to actively select one or more optimal communication modes from a plurality of simultaneously available communication modes (e.g., communication modes that are not disconnected, dropped, or otherwise incapable of communicating data). Optionally, the step 330 may also include automatically excluding any communication modes that are not currently available from the selection process.

The switching criterion can be a predetermined switching criterion input by a user or preconfigured for the movable object. For example, the switching criterion can be stored into a memory of the movable object prior to operation of the movable object. Alternatively, the switching criterion can be transmitted to the movable object prior to or during operation, such as from a remote terminal. In some instances, the switching criterion may be dynamically determined based on one or more dynamically changing parameters. For example, the switching criterion may be dynamically determined based on a state of the movable object and/or the terminal (e.g., position, orientation, whether data is currently being transmitted, or the type of data to be transmitted). The switching criterion can be dynamically determined based on a state of the movable object and the terminal relative to each other, such as the distance between the movable object and the terminal, whether there is line of sight between the movable object and the terminal, or the direction of data transmission between the movable object and the terminal. In some embodiments, the switching criterion can be dynamically determined based on a state of a payload of the movable object, such as a state of a payload camera (e.g., position, orientation, whether it is turned on or off, whether it is recording, recording frame rate, the number of images recorded, image resolution, image size, or image quality). Alternatively or in combination, the switching criterion can be dynamically determined based on a state of one or more of the plurality of communication modules (e.g., whether it is turned on or off; signal strength, speed, latency, bandwidth, quality, range, or cost). Determination of the switching criterion may occur continuously (e.g., in real-time) or periodically (e.g., at specified time intervals or in response to certain events).

In some embodiments, the switching criterion can include a plurality of rules or instructions to be followed when selecting a communication mode. For example, a rule can include selecting one or more communication modes that meet a predetermined standard. In some instances, the rule can include selecting all communication modes that meet a predetermined standard. Conversely, a rule can include rejecting one or more communication modes that do not meet a predetermined standard. A rule can include rejecting all communication modes that do not meet a predetermined standard.

In some embodiments, the switching criterion can be based one or more characteristics of a communication mode, such as the characteristics evaluated and/or calculated in step 320. For example, the predetermined standard may be a standard for one or more characteristics of a communication mode. In some instances, the predetermined standard and the characteristic can be expressed as numerical values. Optionally, a calculation can be performed to determine whether the characteristic meets the predetermined standard. The predetermined standard can include a minimum threshold value that the characteristic must exceed. Alternatively or in combination, the predetermined standard can include a maximum threshold value that the characteristic cannot exceed. The predetermined standard can include a range of values that the characteristic must remain within. Alternatively, the predetermined standard can include a range of values that the characteristic is not allowed to be.

In some instances, a predetermined signal strength threshold value can be determined for a received signal strength of a communication mode. Accordingly, the switching criterion can include a rule to select any communication modes having a received signal strength exceeding a predetermined threshold strength value. Alternatively, the switching criterion can include a rule to select a plurality of communication modes in order of highest received signal strength. Optionally, the switching criterion may include a rule to select only the single communication mode having the highest received signal strength. Furthermore, the switching criterion can include a rule to switch away from a communication mode having a received signal strength less than a predetermined threshold strength value or a received signal strength of another communication mode.

For example, a switching criterion can be implemented to select one of a point-to-point communication mode and an indirect communication mode for transmitting data. The switching criterion can include a rule to select the communication mode having the highest received signal strength. When communicating over a short range or within line of sight, the point-to-point method may have a higher signal strength than the indirect communication mode, and is thus selected over the indirect communication mode for data transmission. Conversely, when communicating over a long range or out of line of sight, the indirect communication mode may have a higher signal strength than the point-to-point communication mode, and is thus selected over the point-to-point communication mode for data transmission.

Similarly, a predetermined signal quality threshold value can be determined for a received signal quality of a communication mode. For example, switching criterion can include a rule to select any communication modes having a received signal quality exceeding a predetermined threshold quality value. In some instances, the predetermined threshold quality value can be based on a specified BER (e.g., a user-input BER or a BER stored in memory). For example, data transmissions calculated to have a BER less than the specified BER for a certain time interval may be considered to have a signal quality exceeding the predetermined threshold quality value. Alternatively, the switching criterion can include a rule to select a plurality of communication modes in order of highest received signal quality. Optionally, the switching criterion may include a rule to select only the single communication mode having the highest received signal quality. Furthermore, the switching criterion can include a rule to switch away from a communication mode having a received signal quality less than a predetermined threshold quality value or a received signal quality of another communication mode. In some instances, data transmissions having a BER greater than a specified BER for a certain time interval may be considered to have a signal quality less than the predetermined threshold quality value.

For example, a switching criterion can be implemented to select one of a point-to-point communication mode and an indirect communication mode for transmitting data. The switching criterion can include a rule to select the communication mode having the highest received signal quality. When communicating over a short range or within line of sight, the point-to-point method may have a lower BER than the indirect communication mode, and is thus selected over the indirect communication mode for data transmission. Conversely, when communicating over a long range or out of line of sight, the indirect communication mode may have a lower BER than the point-to-point communication mode, and is thus selected over the point-to-point communication mode for data transmission.

In some embodiments, the switching criterion can include a rule to prioritize one or more prioritized communication modes relative to other communication modes. For example, if a prioritized communication mode is available, the switching criterion can include a rule to always select the prioritized communication mode for transmitting data regardless of its evaluated characteristics. Alternatively, the switching criterion can include a rule to always select the prioritized communication mode unless one or more of its evaluated characteristics fails to meet a predetermined standard. Conversely, a non-prioritized or backup communication mode may be never selected for data transmission, unless the prioritized communication mode is unavailable or fails to meet a predetermined standard.

In some embodiments, a prioritized communication mode may utilize a point-to-point communication method. Accordingly, the switching criterion may include a rule to use the prioritized communication mode to transmit data under most circumstances. However, in some instances, the prioritized communication mode may not be optimal. For example, a point-to-point communication method may be unavailable, have a signal strength less than a predetermined strength threshold value, or a signal quality less than a predetermined quality threshold value in some instances, such as when the movable object and the terminal are separated by a large distance or not within line of sight of each other. Consequently, under these circumstances, the switching criterion may include a rule to switch to using a non-prioritized communication method, such as an indirect communication method.

In step 340, data is transmitted along the one or more selected communication modes. Any suitable type of data can be transmitted using the selected communication modes. For example, the data can include data collected by the movable object, such as sensor data collected by one or more sensors of the movable object. The sensor data can include position data, orientation data, motion data, proximity data, image data, and the like. In some embodiments, the data can include control data, such as control data generated by the terminal and configured to control a state of the movable object (e.g., altitude, latitude, longitude, roll angle, pitch angle, yaw angle). Other examples of control data generated by the terminal are described in further detail elsewhere herein. In some embodiments, the data can be generated by another entity in communication with the movable object and/or terminal. For example, the movable object may obtain and transmit sensor data from one or more sensors provided separately from the movable object (e.g., on another movable object or remote device). As another example, the terminal may obtain and transmit control data from a remote device communicating with the terminal.

The data can be transmitted using suitable transmitter or transceiver of a communication module of the selected communication modes, as previously described herein. In some embodiments, in order to ensure seamless and continuous data transmission, suitable coordination methods can be implemented to ensure that data is not delayed or dropped when switching from one communication mode to another. For example, a suitable coordination method can be based at least in part on a multipath transmission control protocol (multipath TCP) or any other protocol adapted for allow seamless data transmission over a plurality of networks. The coordination method can also be based at least in part on a mobile IP (e.g., Mobile IPv4 or Mobile IPv6) or any other protocol adapted to allow a device to roam between a plurality of networks while maintaining a set network IP address. One or more coordination methods may be implemented during other steps of the method 300 to ensure seamless data transmission during step 340. For example, the step 310 can include connecting to multiple communication modes using multipath TCP- and/or mobile IP-based methods.

In some embodiments, data can be transmitted along other communication modes in addition to the one or more selected communication modes. The other communication modes can be used to ensure seamless data transmission even as switching occurs. For example, when switching from a first communication mode to a second communication mode, data transmission can occur via both modes for a certain period of time before switching to transmitting exclusively via the second communication mode. Alternatively, data can be continuously transmitted using a backup communication mode in addition to the selected communication mode. This approach can be used to ensure seamless connectivity even when sudden interruptions in the selected communication mode occur. The backup communication mode can be a communication mode having a relatively long range (e.g., mobile phone network) such that it is unlikely to be interrupted or disconnected. The backup communication mode can transmit the same data as the selected communication mode. Optionally, the backup communication mode can just transmit a small amount of data (e.g., a heartbeat) when the selected communication mode is operating normally, which may be advantageous for minimizing data transmission costs.

The steps of the method 300 can be performed in any suitable order. Some of the steps can be repeated more than once. Some of the steps may be optional. For example, step 310 can be performed continuously during operation of the movable object, such that communication links are continuously being established or reestablished as the states of the movable object, terminal, and/or communication modules change (e.g., as the movable object moves closer to or farther from the terminal, as the signal strength received by a communication module increases or decreases). Alternatively, the communication links may be maintained once established, such that step 310 only needs to be performed once. Steps 320, 330, and/or 340 can be repeated at any suitable frequency during operation of the movable object in order to continuously monitor and optimize data transmission.

Figure 4:
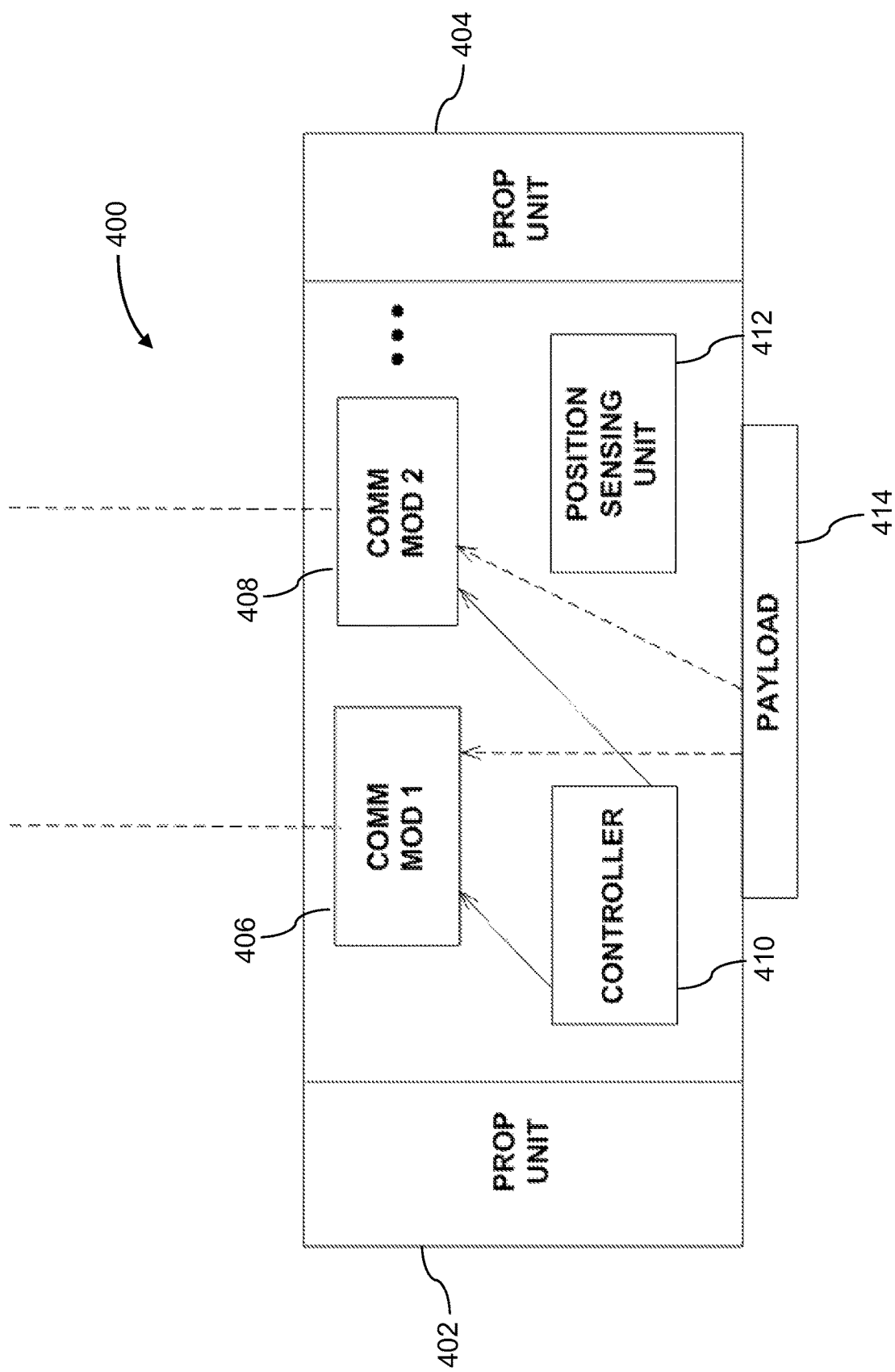
FIG. 4 illustrates a movable object configured for adaptive communication mode switching, in accordance with embodiments.

FIG. 4 illustrates a movable object 400 configured for adaptive communication mode switching, in accordance with embodiments. The movable object 400 can be a self-propelled movable object with propulsion units 402, 404. The propulsion units 402, 404 can be any suitable propulsion system, such as the embodiments described herein. The movable object 400 can communicate to a remote terminal using a plurality of communication modes, including a first communication mode utilizing a first communication module 406 and a second communication mode utilizing a second communication module 408. The movable object can also include a controller 410, a position sensing unit 412, and/or a payload 414.

Although the remote terminal is not depicted in FIG. 4, it is understood that the remote terminal can also include a plurality of communication modules corresponding to the communication modules of the movable object 400, and can also include a controller operable to control the communication modules and implement adaptive communication mode switching as described herein for the controller 410. Accordingly, any description of adaptive communication mode switching provided herein with respect to the movable object can also be applied to the remote terminal.

The plurality of communication modules, including first and second communication modules 406 and 408, can each be configured to communicate with a corresponding communication module of the remote terminal, as previously described herein. In some embodiments, the communication modules are operably coupled to the payload 414 and configured to transmit data from the payload 414. For example, the communication modules can be used to transmit sensing data collected from one or more sensors of the payload 414, such as image data collected by a camera. Any description herein relating to transmission of image data can be applied to transmission of other types of data, and vice-versa. In some embodiments, all of the communication modules can be used to transmit data from the payload 414. Alternatively, only some of the communication modules may be operable to transmit payload data. Additionally, although the embodiment of FIG. 4 depicts only payload data being transmitted, other types of data can also be transmitted via the plurality of communication modules. For example, position, orientation, and/or movement data of the movable object 400, which can be provided using suitable sensors of the position sensing unit 412, can also be transmitted remotely using the plurality of communication modules. As another example, flight parameter data of the movable object 400 (e.g., position, velocity, acceleration, flight trajectory or plan, or any other suitable parameters of the movable object 400 during flight).

In some embodiments, a controller 410 can be used to provide control signals enabling adaptive communication mode switching between the plurality of communication modes, such as between first and second communication modes utilizing the first and second communication modules 406 and 408. The controller 410 can be an on-board controller situated on the movable object 400. Alternatively, the controller can be a device separate from or external to the movable object 400, such as a component of a remote terminal. The controller 410 may include a processing unit and a non-transitory computer readable medium including instructions executable by the processing unit, such as the embodiments described elsewhere herein. In some embodiments, the controller 410 can be configured to implement an adaptive communication mode switching method, such as the methods described herein (e.g., the method 600). For example, the controller 410 can be operably coupled to the plurality of communication modules and configured to control the plurality of communication modules to establish a plurality of simultaneous respective communication links to a remote terminal. In some instances, one or more processors of the controller 410 can be configured to select at least one of the plurality of communication modes to be used for transmitting data, based on a switching criterion. The controller 410 can also be configured to cause data transmission to occur using the communication modules of the selected communication modes.

In some instances, the movable object can be configured to generate and transmit image data to a terminal or other remote device (e.g., for aerial surveillance or reconnaissance). Image data may include snapshots or video imagery. The movable object (e.g., UAV) may be used for photography and/or videography. Transmission of image data may require higher speed, lower latency, and/or larger bandwidth compared to transmission of other types of data (e.g., control data, position data, orientation data, or motion data). Existing approaches for transmitting image data from a movable object may be limited to transmission over relatively short distances. However, the systems, methods, and devices for adaptive communication mode switching described herein can provide robust and seamless image transmission over long distances.

Figure 5:
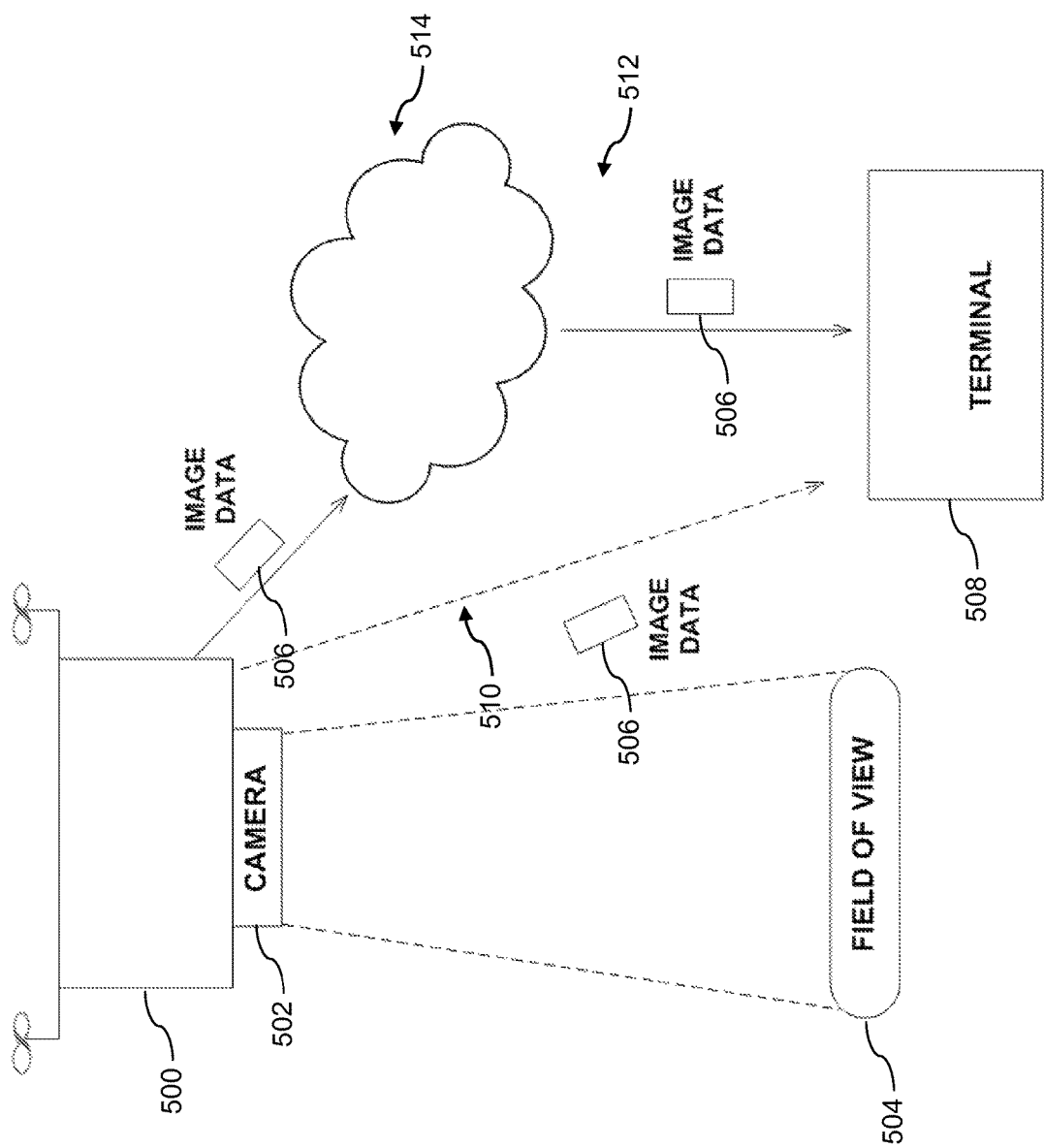
FIG. 5 illustrates a movable object configured for adaptive communication mode switching for image data transmission, in accordance with embodiments.

FIG. 5 illustrates a movable object 500 configured for adaptive communication mode switching for image data transmission, in accordance with embodiments. The movable object 500 can be a self-propelled movable object having a plurality of propulsion systems, as previously described herein. The movable object 500 can include a camera or image sensor 502, which can be part of a payload. Alternatively, as previously mentioned, the camera 502 can provided separately from the movable object 500 (e.g., on a different movable object or other remote device in communication with the movable object 500). Other types of sensing systems can also be used, as previously described herein, and the description herein pertaining to transmission of image data can be applied to transmission of any type of data. The camera 502 can be supported by a carrier or other suitable mounting platform (not shown). The camera 502 can be mounted on any suitable portion of the movable object 500, such as on the top, on the bottom, on the front, on the back, or on a side of the movable object 500. For example, the camera can be mounted on the underside of the movable object 500 and pointing downwards relative to the movable object 500, such that its field of view 504 is primarily directed downwards. However, the field of view 504 may also be oriented in other directions relative to the movable object 500, such as above, in front, behind, or to a side of the movable object 500. Optionally, the camera 502 can be moved relative to the movable object 500, such as translated with up to three degrees of freedom or rotated with up to three degrees of freedom, such that the field of view 504 can be correspondingly altered. When desired, the size of the field of view 504 can be changed, such as by changing the focus or zoom settings of the camera 502. The field of view can be altered in response to an instruction from an external object, such as a terminal, or may be adjusted automatically with aid of a processor.

The camera 502 can be used to generate image data 506 of the field of view 504. The image data 506 can include still images (e.g., photographs) or dynamic images (e.g., video). The image data 506 can be associated with one or more image parameters, such as file size, resolution, frame rate, quality, or format. The image parameters can influence the requirements for optimal image data transmission. For example, a high speed communication method may be preferred for transmitting images with large file sizes, high resolution, and/or high quality. Conversely, images that have small file sizes, low resolution, and/or low quality may be suitable for transmission using either high speed or low speed communication methods. In some instances, video images captured at a high frame rate may require high speed communication methods to achieve real-time streaming to a remote user, while video images capture data at a low frame rate may be transmitted using low speed communication methods without imparting substantial streaming delays.

In some embodiments, the image data 506 can be transmitted from the movable object 500 to the terminal 508 using a plurality of communication modes, as previously described herein. Any suitable number and combination of communication modes can be used. For example, a first communication module of the movable object 500 can implement a point-to-point communication method (e.g., WiFi, WiMAX, COFDM) for transmitting the image data 506 via a first communication link 510. A second communication module of the movable object 500 can utilize an indirect communication method (e.g., mobile phone networks) for transmitting the image data 506 via a second communication link 512. The second communication link 512 can include a plurality of intermediate network nodes 514 for transmitting the image data 506, which can be of any number or type as previously described herein. The indirect communication method may have a transmission speed slower than that of the point-to-point communication method, but fast enough for satisfactory image data transmission. In some instances, the image data may be transmitted to the terminal via one or more indirect communication methods without utilizing direct communication methods.

Figure 6:
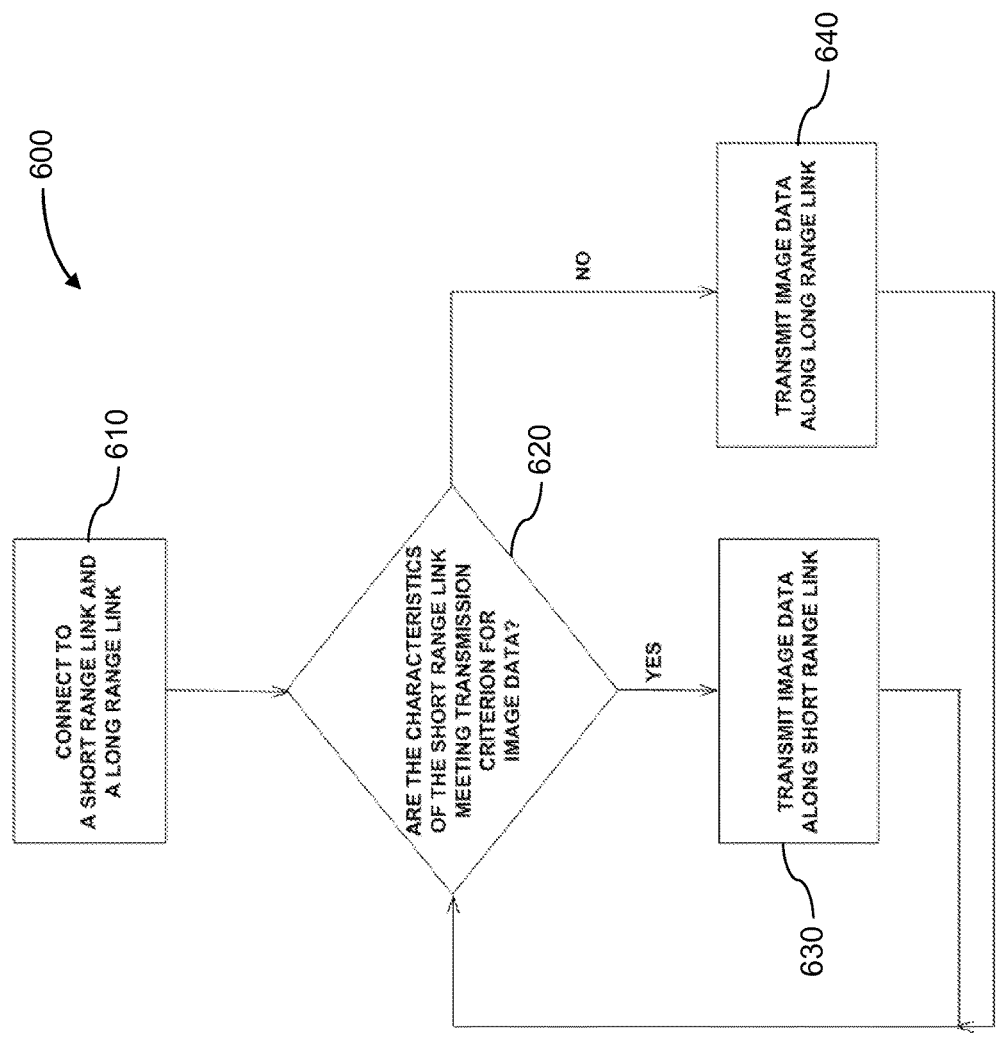
FIG. 6 is a flowchart illustrating a method for adaptive communication mode switching for image data transmission, in accordance with embodiments.

FIG. 6 is a flowchart illustrating a method 600 for adaptive communication mode switching for image data transmission, in accordance with embodiments. The method 600 can be implemented by any suitable embodiment of the systems and devices described herein. As previously mentioned, descriptions pertaining to image data can be applied to any type of data. Additionally, although FIG. 6 depicts a short range communication link and a long range communication link, the method 600 can be applied to any number of communication links having any suitable properties, as described elsewhere herein.

In step 610 of the method 600, the movable object connects to a short range communication link and a long range communication link (e.g., using corresponding short range and long range communication modules). Short range and long range may refer to absolute or relative data transmission ranges. For example, a short range communication link may have a maximum communication distance that is smaller than a maximum communication distance of a long range communication link. The short and long range communication links can be used to communicate with a remote terminal, as previously described.

To adaptively switch between using the short range and long range communication link for data transmission, a switching criterion can be implemented, as depicted in the steps 620, 630, and 640. In FIG. 6, the implementation of the switching criterion is depicted as prioritizing the short range communication link over the long range communication link. For example, the short range communication link may be prioritized due to having superior data transmission speed, latency, bandwidth, quality, and/or cost compared to the long range communication link. However, in some embodiments, the long range communication link may be prioritized over the short range communication link. Alternatively, implementation of the switching criterion may not prioritize either of the communication links.

In step 620, it is determined whether the characteristics of the short range communication link are meeting a transmission criterion for transmitting image data. The characteristics can include one or more of signal strength, speed, latency, bandwidth, quality, range, or cost, as previously described herein. Similar to the predetermined standard of a switching criterion, the transmission criterion can be a standard or criterion for the characteristics of a short range communication link. The step 620 can include evaluating the characteristics, such as providing a numerical value representative of the characteristics, as described elsewhere herein. Meeting the transmission criterion may refer to exceeding a numerical value (e.g., specified by the transmission criterion), being less than a numerical value, being equal to a numerical value, being within a range of numerical values, or being outside a range of numerical values.

If the characteristics meet the transmission criterion, then step 630 is performed, in which image data is transmitted along the short range transmission link. Conversely, if the characteristics do not meet the transmission criterion, then step 640 is performed, in which the image data is transmitted along the long range transmission link. For example, the characteristics of the short range communication link may fail to meet the transmission criterion when the movable object is far away from a remote terminal, or when there is no line of sight between the movable object and the remote terminal (e.g., line of sight is obstructed by trees, buildings, terrain, and other structures).

In some embodiments, the image data can also be transmitted simultaneously along both communication links. For example, in step 630, the long range communication link can be simultaneously employed to transmit image data. The simultaneous transmission may occur for only a short period of time (e.g., to provide overlap for seamless switching between communication links) or for a prolonged period of time (e.g., to provide redundancy between communication methods). In some instances, during step 630, the long range communication link can be simultaneously employed to transmit data other than image data, such as a heartbeat as previously described herein.

The steps of the method 600 can be performed in any suitable order. Some of the steps can be repeated more than once. Some of the steps may be optional. For example, step 610 can be performed continuously during operation of the movable object, such that the long range and short range communication links are constantly being established or reestablished as the states of the movable object, terminal, and/or communication links change. Alternatively, the communication links may be maintained once established, such that step 610 only needs to be performed once. In some embodiments, steps 620, 630, and/or 640 can be repeated at any suitable frequency during operation of the movable object to provide continuous optimization of image data transmission.

Figure 7:
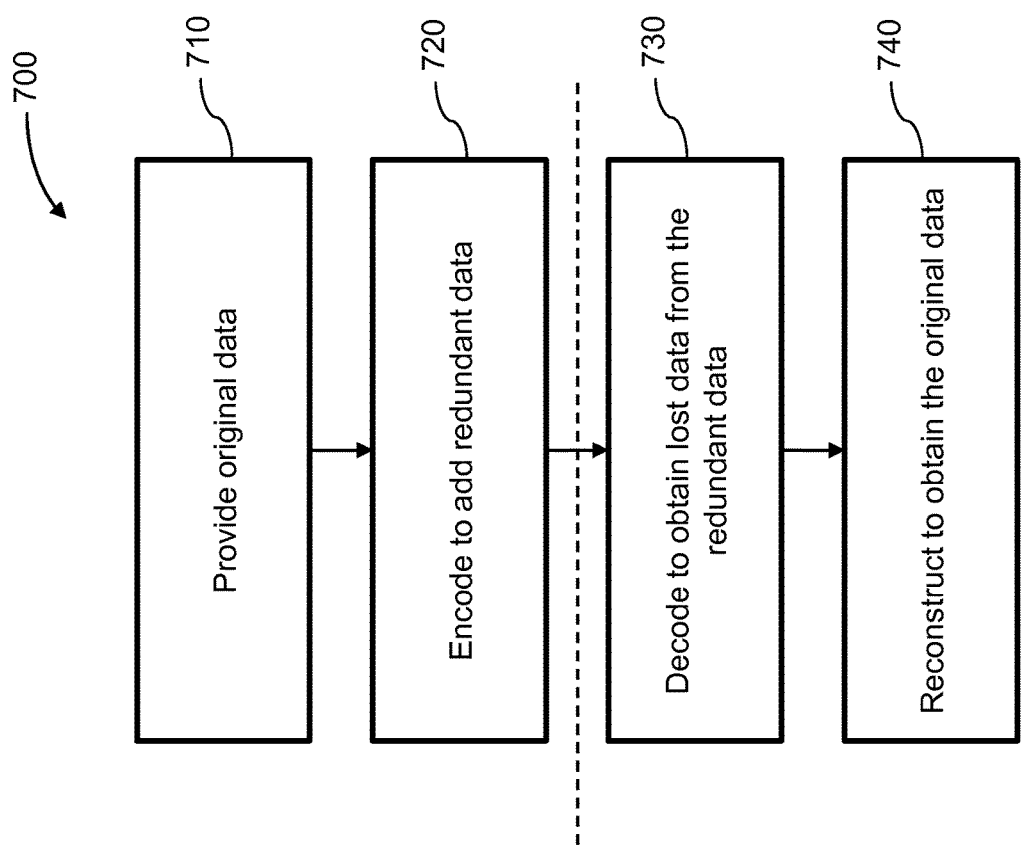
FIG. 7 is a flowchart illustrating a method for forward error correction for data transmission, in accordance with embodiments.

FIG. 7 is a flowchart illustrating a method 700 for forward error correction (FEC) for data transmission, in accordance with embodiments. The method 700 can be implemented by any suitable embodiment of the systems and devices described herein, and can be used in combination with any suitable data transmission method. Advantageously, FEC of data transmissions can be used to reduce the incidence of errors and/or packet loss, and thus may be applied to data transmission via communication modes in which the probability of errors and/or packet loss is relatively high. Since FEC does not require any retransmission of the original data, data latency issues can be avoided. The FEC techniques described herein can be applied to some or all of the communication modes described herein. For example, FEC can be used only for communication modes in which data is transmitted through one or more intermediate network nodes (e.g., indirect communication modes such as mobile phone networks). Conversely, FEC can be used only for direct communication modes. In some instances, FEC can be used for both indirect and direct communication modes.

In step 710, the original data to be transmitted is provided. The data can include any suitable type of data generated by or provided to the movable object (or terminal), such as image data, control data, position data, orientation data, motion data, and the like. In some embodiments, the original data can be provided to a movable object by an operably coupled payload, as described elsewhere herein.

In step 720, the original data is encoded to add redundant data. In some embodiments, the data can be encoded using a predetermined algorithm (e.g., an algorithm for an error-correcting code) such that the redundant data is a function of the original data. Preferably, the encoding is designed such that the original data can be recovered from the redundant data, as described below. The step 720 can be performed, for instance, by a suitable onboard processor. Once the original data has been encoded, it can then be transmitted to a receiving entity (e.g., a movable object or terminal), using any of the communication modes described herein.

In some instances, some of the data may be lost during data transmission (e.g., due to signal degradation, packet drop, noise, etc.). Accordingly, in step 730, the receiving entity decodes the received data to obtain lost data, if any, from the redundant data. The decoding can be performed (e.g., by one or more processors) using a suitable decoding algorithm. In some embodiments, the decoding algorithm may be selected based on the encoding algorithm used in step 710.

In step 740, the data is reconstructed to obtain the original data. By combining the recovered lost data (if any) with the correctly transmitted data, the receiving entity can obtain the original data provided by the transmitting entity.

As previously mentioned, steps 710 and 720 can be performed by a suitable transmitting entity, and steps 730 and 740 can be performed by a suitable receiving entity. For example, the transmitting entity may be a terminal and the receiving entity may be a movable object, or vice-versa. The method 700 can be applied to data transmissions from the terminal to the movable object, data transmissions from the movable object to the terminal, or to data transmissions occurring along both directions. In some embodiments, the method 700 can be performed by a suitable processing system of or operably connected to the communication modules of the transmitting and/or receiving entities.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of an movable object weight to a load weight may be greater than, less than, or equal to about 1:1. In some instances, a ratio of an movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of an movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 8:
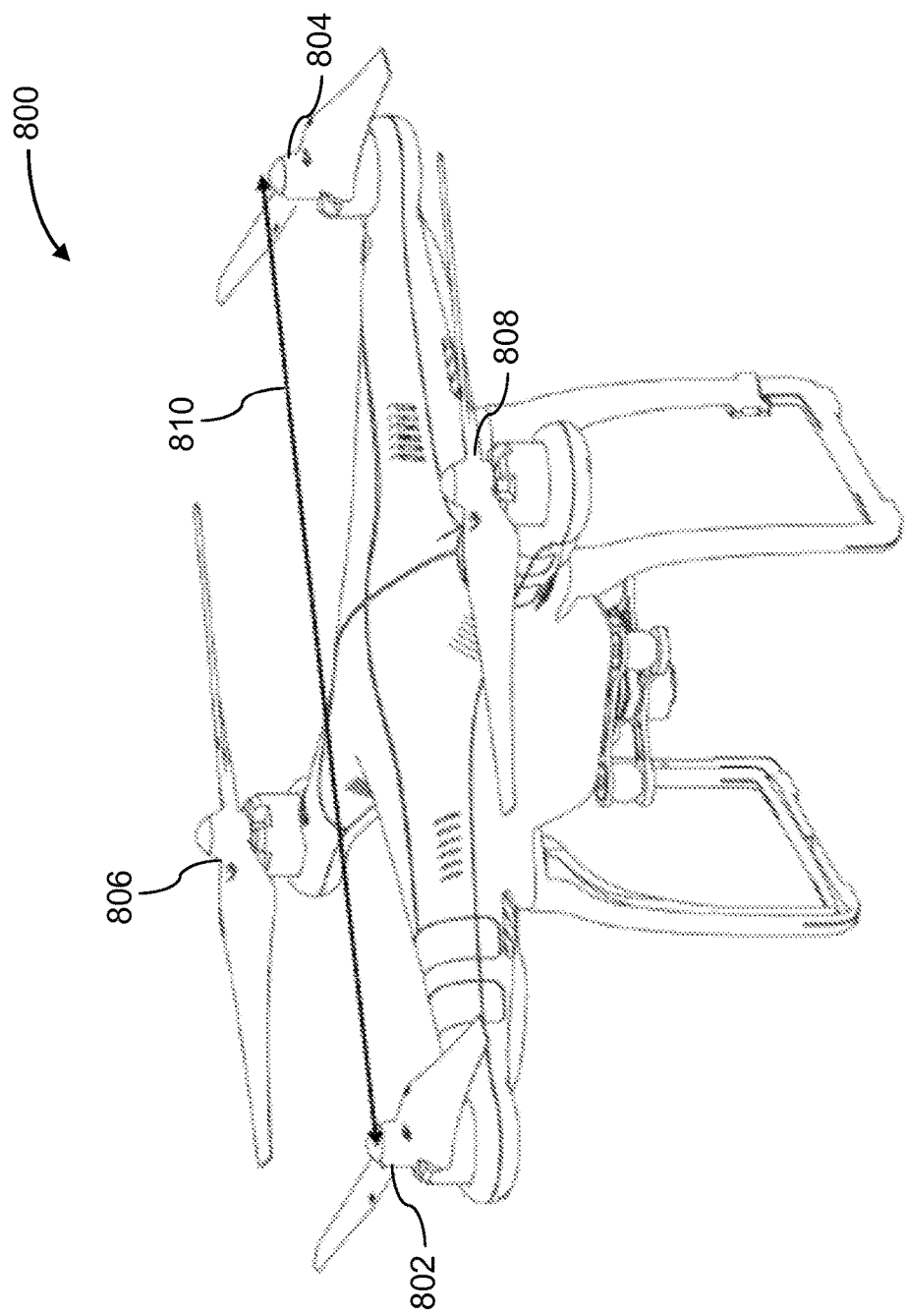
FIG. 8 illustrates an unmanned aerial vehicle, in accordance with embodiments.

FIG. 8 illustrates an unmanned aerial vehicle (UAV) 800, in accordance with embodiments of the present invention. The UAV may be an example of a movable object as described herein. The UAV 800 can include a propulsion system having four rotors 802, 804, 806, and 808. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 810. For example, the length 810 can be less than or equal to 2 m, or less than equal to 5 m. In some embodiments, the length 810 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 9:
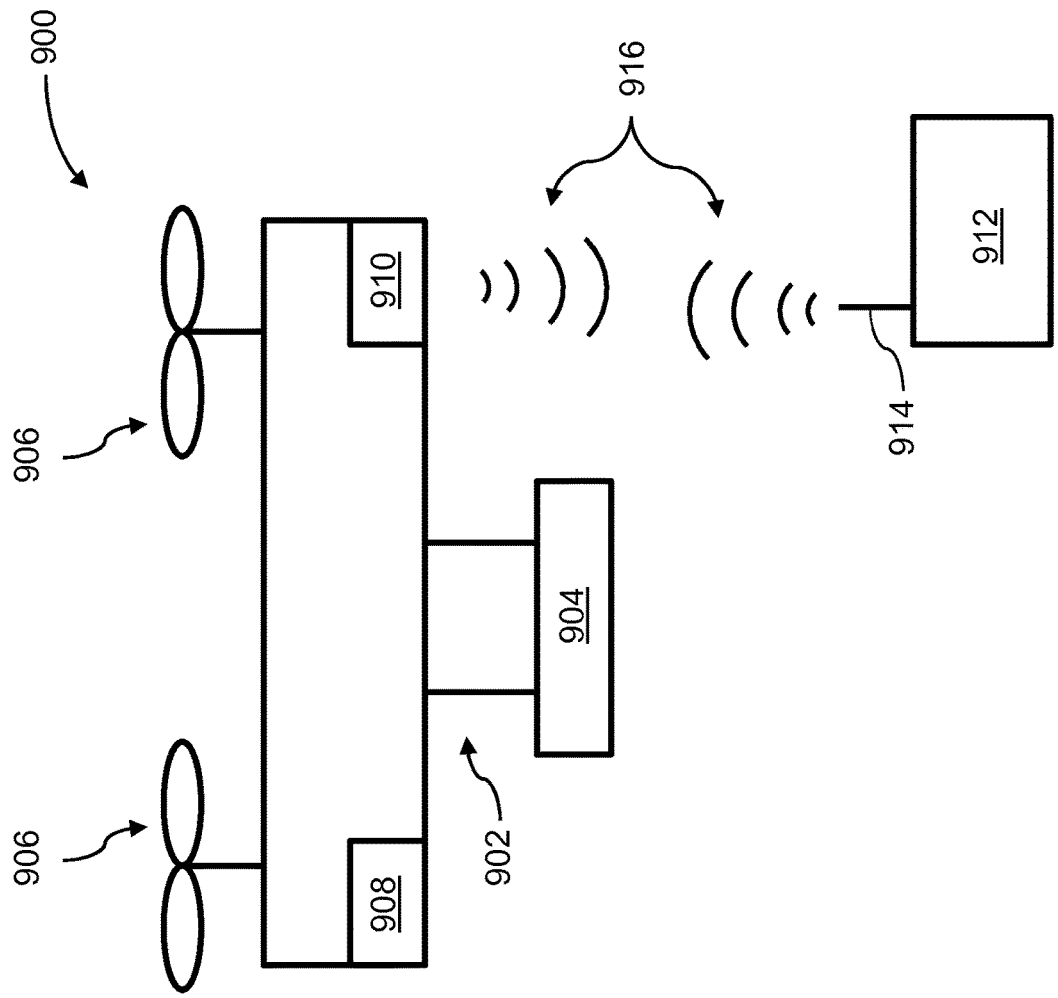
FIG. 9 illustrates a movable object, in accordance with embodiments.

FIG. 9 illustrates a movable object 900 including a carrier 902 and a payload 904, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some instances, the payload 904 may be provided on the movable object 900 without requiring the carrier 902. The movable object 900 may include propulsion mechanisms 906, a sensing system 908, and a communication system 910. The propulsion mechanisms 906 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation.

For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counter-clockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 908 can include one or more sensors that may sense the spatial disposition, velocity, and/or acceleration of the movable object 900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 910 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

Figure 10:
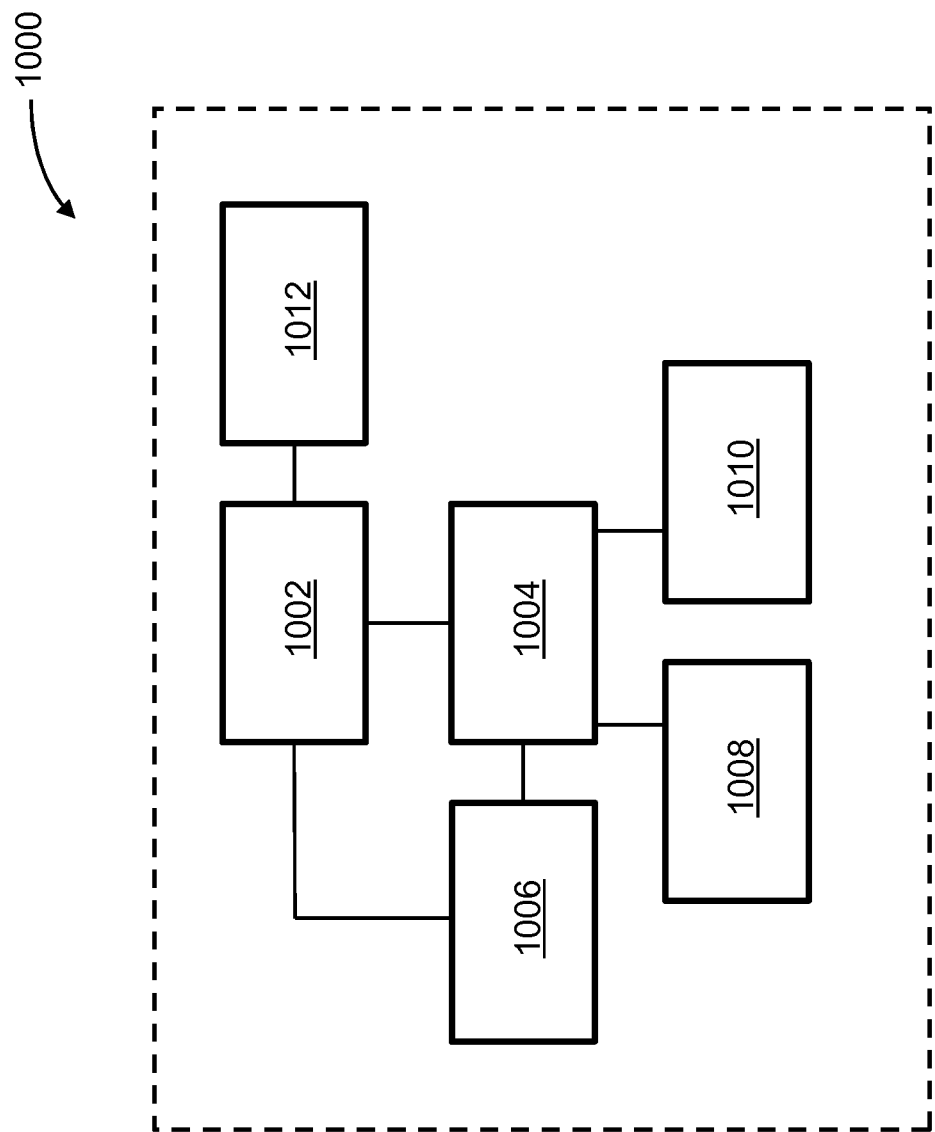
FIG. 10 is a schematic illustration by way of block diagram of a system for controlling a movable object, in accordance with embodiments.

FIG. 10 is a schematic illustration by way of block diagram of a system 1000 for controlling an movable object, in accordance with embodiments. The system 1000 can be used in combination with any suitable embodiment of the systems, devices, and methods disclosed herein. The system 1000 can include a sensing module 1002, processing unit 1004, non-transitory computer readable medium 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors. In some embodiments, the sensing module can be operatively coupled to a transmission module 1012 (e.g., a Wi-Fi image transmission module) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication, as described in further detail below. The communication module 1010 can transmit and/or receive one or more of sensing data from the sensing module 1002, processing results produced by the processing unit 1004, predetermined control data, user commands from a terminal or remote controller, and the like. In some embodiments, the communication module 1010 can be configured to implement adaptive communication mode switching, as described elsewhere herein.

The components of the system 1000 can be arranged in any suitable configuration. For example, one or more of the components of the system 1000 can be located on the movable object, carrier, payload, terminal, sensing system, or an additional external device in communication with one or more of the above. Additionally, although FIG. 10 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for ensuring seamless data transmission while switching communication links between an unmanned aerial vehicle (UAV) and a remote terminal, the method comprising:

performing calculations, based on a switching criterion, to select one of a direct communication link or an indirect communication link to transmit data between the UAV and the remote terminal, the data including image data and non-image data, the direct communication link being established between the UAV and the remote terminal based on a direct communication protocol, and the indirect communication link being established between the UAV and the remote terminal based on an indirect communication protocol via one or more intermediate network nodes, wherein the switching criterion is based on a state of a payload device mounted on the UAV, the state of the payload device including at least one of: an orientation or pose of the payload device relative to the UAV, an on/off state of the payload device, a recording frame rate of the payload device, a number of images recorded by the payload device, an image resolution of images captured by the payload device, an image size of the images captured by the payload device, and an image quality of the images captured by the payload device;

transmitting the data using the one of the direct communication link or the indirect communication link selected based on the calculations; and switching, according to the switching criterion, from the one of the direct communication link or the indirect communication link to another one of the direct communication link or the indirect communication link for transmission of the image data, wherein same data is transmitted simultaneously along both the direct communication link and the indirect communication link during the switch, thereby ensuring seamless data transmission, and when the image data is switched to be transmitted along the direct communication link, the non-image data is simultaneously transmitted along both the direct communication link and the indirect communication link, the non-image data including one or more of: control data for the UAV, position data of the UAV, orientation data of the UAV, and motion data of the UAV.

2. The method of claim 1, wherein the payload device is an image capturing device and the data is image data obtained by the image capturing device.

3. The method of claim 2, wherein the image data comprises a set file size, resolution, frame rate, quality, or format.

4. The method of claim 1, wherein the non-image data is control data configured to control a state of the UAV.

5. The method of claim 1, wherein the direct and indirect communication links are established between communication modules on the UAV and corresponding terminal modules on the remote terminal.

6. The method of claim 1, wherein the switching criterion takes into account characteristics of the direct communication link and the indirect communication link, wherein the characteristics comprise at least one of a signal strength, latency, bandwidth, quality, range or cost.

7. The method of claim 1, wherein the switching criterion is determined continuously or periodically.

8. The method of claim 1, wherein the switching criterion is input by a user or preconfigured for the UAV.

9. The method of claim 1, wherein the switching criterion is dynamically determined based on one or more dynamically changing parameters.

10. The method of claim 9, wherein the dynamically changing parameters comprise (1) a state of the UAV, (2) a state of the UAV and a remote terminal relative to one another, or (3) a state of a communication module of the UAV that is configured to establish the direct communication link with the remote terminal and a state of a communication module of the UAV that is configured to establish the indirect communication link with the remote terminal.

11. A system for ensuring seamless data transmission while switching communication links between an unmanned aerial vehicle (UAV) and a remote terminal, the system comprising:
    a first communication module configured to establish a direct communication link between the UAV and the remote terminal based on a direct communication protocol;
    a second communication module configured to establish an indirect communication link between the UAV and the remote terminal based on an indirect communication protocol via one or more intermediate network nodes; and
    one or more processors, individually or collectively configured to:
        perform calculations, based on a switching criterion, to select one of the direct communication link or the indirect communication link to transmit data between the UAV and the remote terminal, the data including image data and non-image data, wherein the switching criterion is based on a state of a payload device mounted on the UAV, the state of the payload device including at least one of: an orientation or pose of the payload device relative to the UAV, an on/off state of the payload device, a recording frame rate of the payload device, a number of images recorded by the payload device, an image resolution of images captured by the payload device, an image size of the images captured by the payload device, and an image quality of the images captured by the payload device;
        cause transmission of the data to occur using the one of the direct communication link or the indirect communication link based on the calculations; and
        switch, according to the switching criterion, from the one of the direct communication link or the indirect communication link to another one of the direct communication link or the indirect communication link for transmission of the image data, wherein same data is transmitted simultaneously along both the direct communication link and the indirect communication link during the switch, thereby ensuring seamless data transmission, and when the image data is switched to be transmitted along the direct communication link, the non-image data is simultaneously transmitted along both the direct communication link and the indirect communication link, the non-image data including one or more of: control data for the UAV, position data of the UAV, orientation data of the UAV, and motion data of the UAV.

12. The system of claim 11, wherein the payload device is an image capturing device and the data is image data captured by the image capturing device.

13. The system of claim 11, wherein the switching criterion is dynamically determined based on one or more dynamically changing parameters.

14. The system of claim 13, wherein the dynamically changing parameters include one or more of: (1) a state of the UAV, (2) a state of the UAV and a remote terminal relative to one another, or (3) a state of a communication module of the UAV that is configured to establish the direct communication link with the remote terminal and a state of a communication module of the UAV that is configured to establish the indirect communication link with the remote terminal.

* * * * *